(12) United States Patent
Hoffmann et al.

(10) Patent No.: US 7,742,465 B2
(45) Date of Patent: Jun. 22, 2010

(54) METHOD AND DEVICE FOR TAPPING THE PAYLOAD DATA OF MULTIMEDIA CONNECTIONS IN A PACKET NETWORK

(75) Inventors: Klaus Hoffmann, München (DE); Norbert Kreusch, Neuried (DE); Karl Lanzinger, München (DE); Norbert Löbig, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 607 days.

(21) Appl. No.: 11/659,552

(22) PCT Filed: Aug. 4, 2005

(86) PCT No.: PCT/EP2005/053826

§ 371 (c)(1),
(2), (4) Date: Feb. 6, 2007

(87) PCT Pub. No.: WO2006/021494

PCT Pub. Date: Mar. 2, 2006

(65) Prior Publication Data

US 2007/0217423 A1    Sep. 20, 2007

(30) Foreign Application Priority Data

Aug. 20, 2004 (DE) .................. 10 2004 040 480

(51) Int. Cl.
*H04L 12/66* (2006.01)
*H04J 3/00* (2006.01)
*H04B 7/212* (2006.01)

(52) U.S. Cl. .................. 370/352; 370/336; 370/347; 370/442

(58) Field of Classification Search ......... 370/351–357, 370/359, 360, 389, 392, 394, 395.2, 401, 370/422, 442, 285, 260; 379/80, 84, 85, 379/88.16, 88.17, 88.18, 88, 19
See application file for complete search history.

(56) References Cited

U.S. PATENT DOCUMENTS 5,570,372 A    10/1996    Shaffer (Continued)

FOREIGN PATENT DOCUMENTS

CN    1206536 A    1/1999

(Continued)

OTHER PUBLICATIONS

Colin Perkins, "RTP Audio and Video for the Internet", 2003, p. 67-p. 68, p. 97, p. 209—p. 211, p. 216, Paragraph 3—p. 217, Paragraph 3, XP002352474, Addison-Wesley, Pearson Education, Boston, USA.

(Continued)

*Primary Examiner*—Ayaz R Sheikh
*Assistant Examiner*—Blanche Wong
(74) *Attorney, Agent, or Firm*—Laurence A. Greenberg; Werner H. Stemer; Ralph E. Locher

(57) ABSTRACT

In one aspect of the invention, audio and video user data are separated. The audio user data is conducted via a TDM loop, where it is tapped and the video user data is fed to the recipient via the packet network, the separated audio and video user data are then combined again.

7 Claims, 4 Drawing Sheets

U.S. PATENT DOCUMENTS

| | | | |
|---|---|---|---|
| 6,731,657 B1 * | 5/2004 | Anderson et al. | 370/536 |
| 6,870,905 B2 * | 3/2005 | Pelaez et al. | 379/35 |
| 7,360,090 B1 * | 4/2008 | Doskow et al. | 713/170 |
| 2004/0157629 A1 | 8/2004 | Kallio et al. | |

FOREIGN PATENT DOCUMENTS

| | | |
|---|---|---|
| CN | 1509015 A | 6/2004 |
| EP | 1 389 862 A1 | 2/2004 |
| EP | 1 528 774 A1 | 5/2005 |
| WO | WO 01/05109 A1 | 1/2001 |

OTHER PUBLICATIONS

Colin Perkins: "RTP Audio and Video for the Internet", Addison-Wesley, 2003 by Pearson Education, Inc., Boston, MA, XP-002352474.

* cited by examiner

Variant 1:

Closed box [secure!]
Modem integrated

Variant 2:

Open box [not secure!]
Always service-specific connections

Variant 3:

Open box [not secure!]
Service-specific connections on request

METHOD AND DEVICE FOR TAPPING THE PAYLOAD DATA OF MULTIMEDIA CONNECTIONS IN A PACKET NETWORK

CROSS REFERENCE TO RELATED APPLICATIONS

This application is the US National Stage of International Application No. PCT/EP2005/053826, filed Aug. 4, 2005 and claims the benefit thereof. The International Application claims the benefits of German application No. 102004040480.1 DE filed Aug. 20, 2004, both of the applications are incorporated by reference herein in their entirety.

FIELD OF INVENTION

The present invention relates to tapping the payload data of multimedia connections in a packet network.

BACKGROUND OF INVENTION

Modern communication architectures that utilize packet-based or cell-based methods such as Voice over IP (VoIP) or Voice over ATM (VoATM), for example, provide for separation of the connection control and the bearer channel control. The communication between one/a plurality of subscribers such as ISDN/PSTN subscribers, for example, routed via traditional circuit-switched telecommunication networks up to now, is then routed via IP networks. To continue to allow communication with traditional circuit-switched telecommunication networks such as PSTNs (Public Switched Telephone Networks), a "translation" between the two different transport technologies is required, which is performed in crosspoints. At such a crosspoint, the first transport technology for the payload information is converted into the second transport technology by using specific facilities designated as a Media Gateway (MG).

The Media Gateways themselves are controlled by central entities, the Media Gateway Controllers (MGC). The signaling information transmitted between two Media Gateway Controllers is transported, for example, by using a BICC protocol (Bearer Independent Call Control Protocol) or SIP/SIP-T protocol. The Media Gateway Controllers are essentially used for the coordination of the Media Gateways and monitor/control connections (bearer connections) between the Media Gateways. The control of the Media Gateways is effected, for example, with the aid of the MGCP (Media Gateway Controller Protocol) or the H.248 protocol.

In the case of packet-based connections, particularly in the case of connections routed via the IP network, the payload data stream is therefore routed direct between the subscribers or gateways involved outside the switching office. The legally prescribed possibility of tapping the payload data (Lawful Interception, LI), designated as LI for short in the following, is usually effected via a conventional interface outside the packet network, implemented in TDM technology. An outgoing call via the packet network with a pure audio connection from an A subscriber who has to be monitored is then tapped in a TDM loop. This means that a conversion to TDM must be performed first. There, the payload data is tapped, forwarded to the parties tasked in this respect (LEAs, Law Enforcement Agencies), designated as LEAs for short in the following, then converted back into an IP protocol and fed to the called subscriber (B subscriber).

The corresponding relationships are shown in FIG. 1. For the purposes of tapping the voice connections in the packet network, the data stream is routed via Media Gateways MG in a loop to the TDM network and back. In the TDM network, the data stream is tapped in the known manner.

SUMMARY OF INVENTION

However, the double conversion of the payload data stream brings with it serious disadvantages in terms of the end-to-end quality of the payload data transmitted. This would also apply particularly to video information which would have to be tapped in the case of video telephony. Moreover, this broad-band payload data (>64 kbit/s, e.g. video) does not lend itself to problem-free transfer into the narrow-band TDM network. This is another reason why TDM Gateways are not equipped with video interfaces.

In the case of video telephony, mixed audio/video payload data is produced. As soon as a mixed audio and video connection is set up in the packet network, however, the video portion/stream would have to be suppressed in the case of tapping via TDM conversion. This has a strong adverse effect on the subscriber connection (no video image), however, and the monitoring function would be detectible to the monitored subscriber. There is, therefore, de facto no longer any possibility of tapping for a potential video connection, either for audio or for video. Only statistical data and signaling data (Interception Related Information, IRI) for the call can be secured.

In practice, this means that subscribers can only be monitored while they are making telephone calls in the TDM network. Since video telephony now occupies a permanent place in the service offerings of the fixed network operators, a problem arises here for the feature LI, since the associated video payload data stream is taken away from access by the LEAs (Law Enforcement Agencies) in the packet network. In the absence of corresponding standards, the LEAs currently have no IP-based interfaces. The intended rapid and broad-based introduction of video telephony accentuates the demand position for LI in this regard.

An object underlying the invention is to disclose a way in which the feature LI can be deployed efficiently for multimedia connections.

The invention is achieved, on the basis of the features specified in the claims.

An advantageous aspect of the invention is that a separation of audio payload data and video payload data is performed. This can be effected, for example, by means of a double connection setup, the first connection being in the form of a pure audio connection [and] a second connection being in the form of a video connection. If the terminal supports the issuing of different packet addresses in the context of a single connection, the audio portion and the video portion can also be separated via the issuing of different packet addresses in the context of one connection, as an alternative to the setup of two connections.

The audio payload data is then routed via a TDM loop and can be tapped in the classical manner. It is particularly advantageous in this respect that facilities that are already available according to the prior art can be used. This applies particularly to existing interfaces to the LEAs, which can use existing interchange points.

The separation of the multimedia connection into two calls is no more perceptible to the subscriber than the issuing of different packet addresses in the case of one call. It is just in the case of disrupted lip synchronization that the subscriber can possibly draw the conclusion of being monitored. If, in this case, a suitable change of the audio codec (e.g. G.711, G.726, G728, G.723.1, G.729) is performed, this risk is thereby also reduced.

With regard to the video connection, at least statistical data/signaling data is captured. The Media Gateway Controller exerts no influence at all on the bandwidth of the video payload data steam in terms of ability to distribute it to LEAs via a 64 kbit/s interface; the video payload data stream is routed exclusively in the packet network. To this extent, no restriction arises by means of the conversion of the video payload data to 64 kbit/s, which restriction the monitored subscriber would easily detect due to the deterioration in quality.

Advantageous developments of the invention are specified in the dependent claims.

BRIEF DESCRIPTION OF THE DRAWINGS

In the following, the invention is explained in detail on the basis of two exemplary embodiments represented in the form of diagrams.

The diagrams show.

DETAILED DESCRIPTION OF INVENTION

Figure 1:
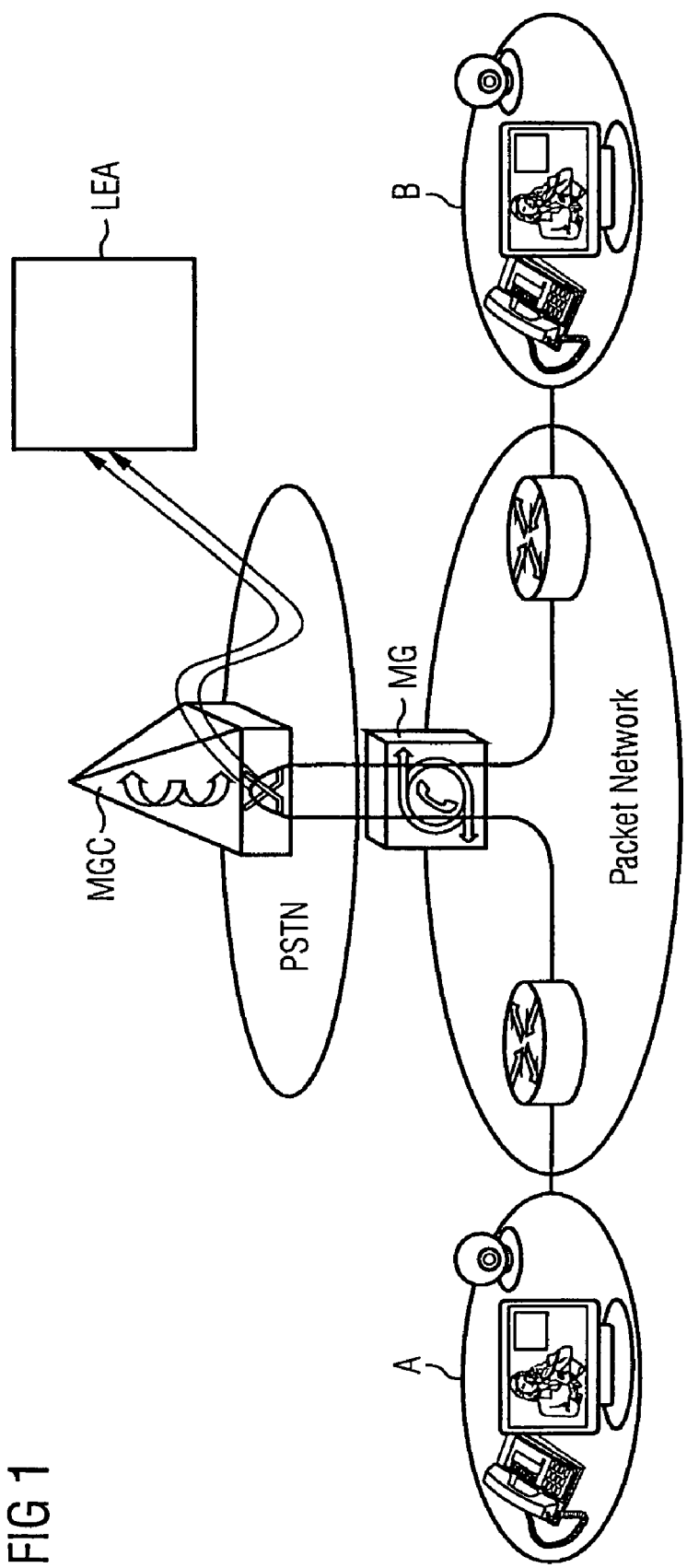
FIG. 1 A network configuration with PSTN/ISDN terminals, Media Gateways and Media Gateway Controllers, and LEAs according to the prior art, FIG. 2 A device according to the invention, according to which two connections are set up, FIG. 3 The signaling messages and protocol elements used in the example of the SIP protocol, FIG. 4 A device according to the invention, according to which just one connection is set up.
Figure 2:
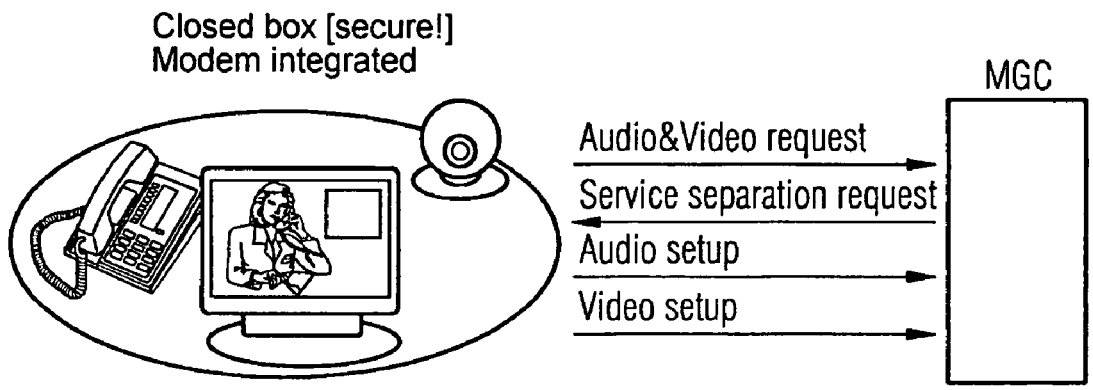
Figure 2:
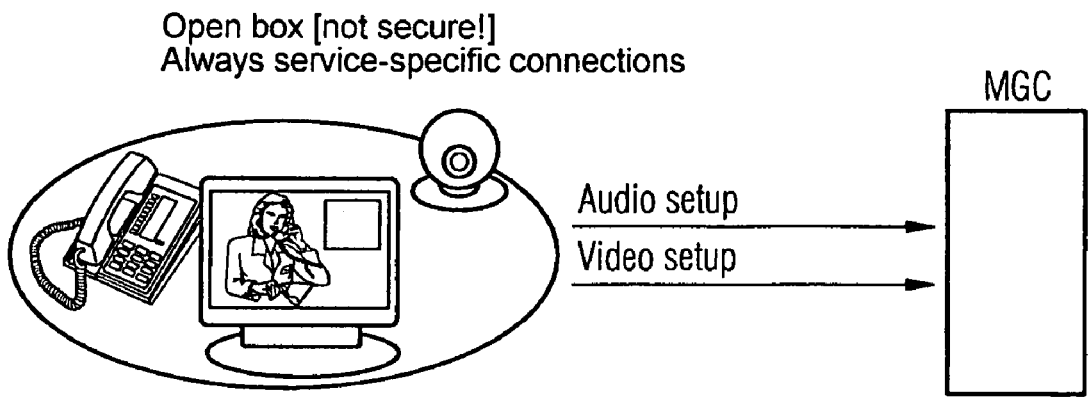
Figure 2:
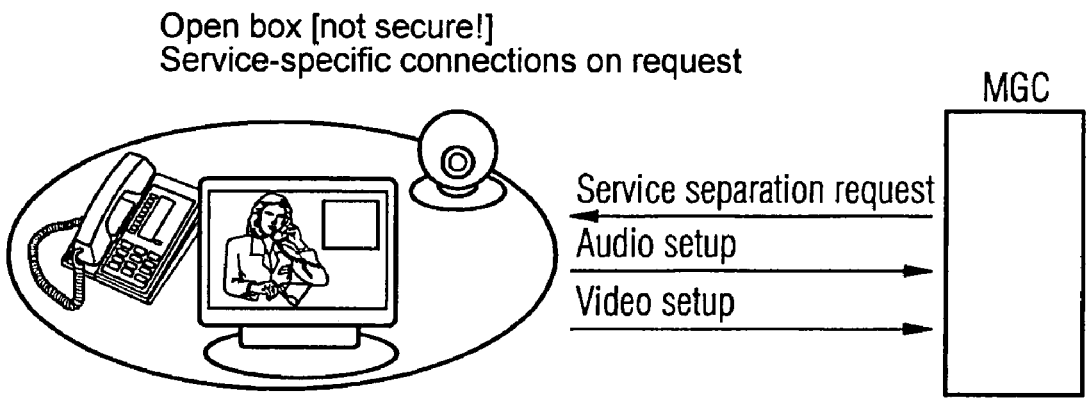

FIG. 2 shows a first exemplary embodiment according to the invention on the basis of three variants. Common to all variants is the fact that the terminal of a subscriber is in the form of a set-top box and is connected to a Media Gateway Controller MGC via a broadband connection. According to the invention, the payload data stream (bearer stream) is then separated into two streams, the audio payload data stream and the video payload data stream, in the case of multimedia calls. The two payload data streams are then treated differently in the following.

The audio payload data stream is routed via a TDM loop and tapped in the classical manner. Available facilities can be used, particularly existing interfaces to the LEAs. The video payload data stream is routed via the packet network between the two subscribers. With regard to the video call, just the call data is secured.

According to the first variant in FIG. 2a, the Media Gate Controller MGC detects whether the subscriber A is to be monitored according to LI. A corresponding list is kept in the Media Gate Controller MGC for this purpose. If the check results in the fact that subscriber A is to be monitored, the terminal of subscriber A is signaled to the effect that different connections have to be set up for different services (i.e. audio/video without audio). For this purpose, the "Audio & Video Request" message fed to the Media Gate Controller MGC by subscriber A prior to the connection setup is acknowledged with a "Service Separation Request" message. The terminal of subscriber A then sets up two connections, one audio connection and one video connection. Since these events in the terminal could be ascertained in principle by subscriber A, the terminal is to be in the form of a closed box, which is not accessible from the outside.

FIG. 2b shows how this signaling can also be omitted as an alternative. This can be effected in all cases where the terminals request separate connections as standard for different services (i.e. pure audio connection and pure video connection). Since two connections always have to be set up in every connection setup, the terminal can be in open form and therefore accessible from the outside, since the subscriber does not notice a monitoring event as no special signaling is provided in the terminal for this case.

FIG. 2c shows a third variant. Here, a separation initiated by the Media Gateway Controller MGC is always performed by means of the "Service Separation Request" message. This is advantageous for terminals that need such a prompt. The terminal itself can be realized as an open box since the subscriber does not notice a monitoring event here either.

The variants refer to the functionality of the related terminal. Basically, it is a common aspect of all variants that the two payload data streams are treated differently and fed via different pathways to the B-end terminal. The latter combines the two calls back into one call. If the delay generated by the double TDM/IP conversion is too great, so that there is a risk of the lip synchronization being disrupted, a suitable change of the codec in the audio stream is effected as an optional event. The decision to change to a suitable codec in the audio stream can be effected, for example, on the basis of a network property.

The two calls do not necessarily need to be set up at the same time. Thus, following subscriber input during a TDM call, a new call can be set up, controlled by the terminal, via the IP network, which new call transmits the audio and video payload data. The subscriber can therefore switch between the audio and the video connection as desired. The first connection setup is always effected with audio service only.

The standard protocol SIP is used, for example, as the signaling protocol to the subscriber. The invention is not restricted to this protocol, however; other protocols such as H.323 or H.248 can similarly be used. Using the example of the signaling protocol SIP, the individual signaling messages and protocol elements, which are needed for implementation, are now to be disclosed.

By way of example, the Media Gateway Controller MGC includes a SIP Proxy Server and a switching processor. The signaling messages between the subscriber and the switching processor are directed via the SIP Proxy Server. The switching processor consists in turn of a front-end unit (PCU), which is responsible for the IP interface and the handling of the IP protocols, and a switching Core System, which can control not only IP but also TDM switching technology and can route calls via a TDM loop for LI.

Figure 3:
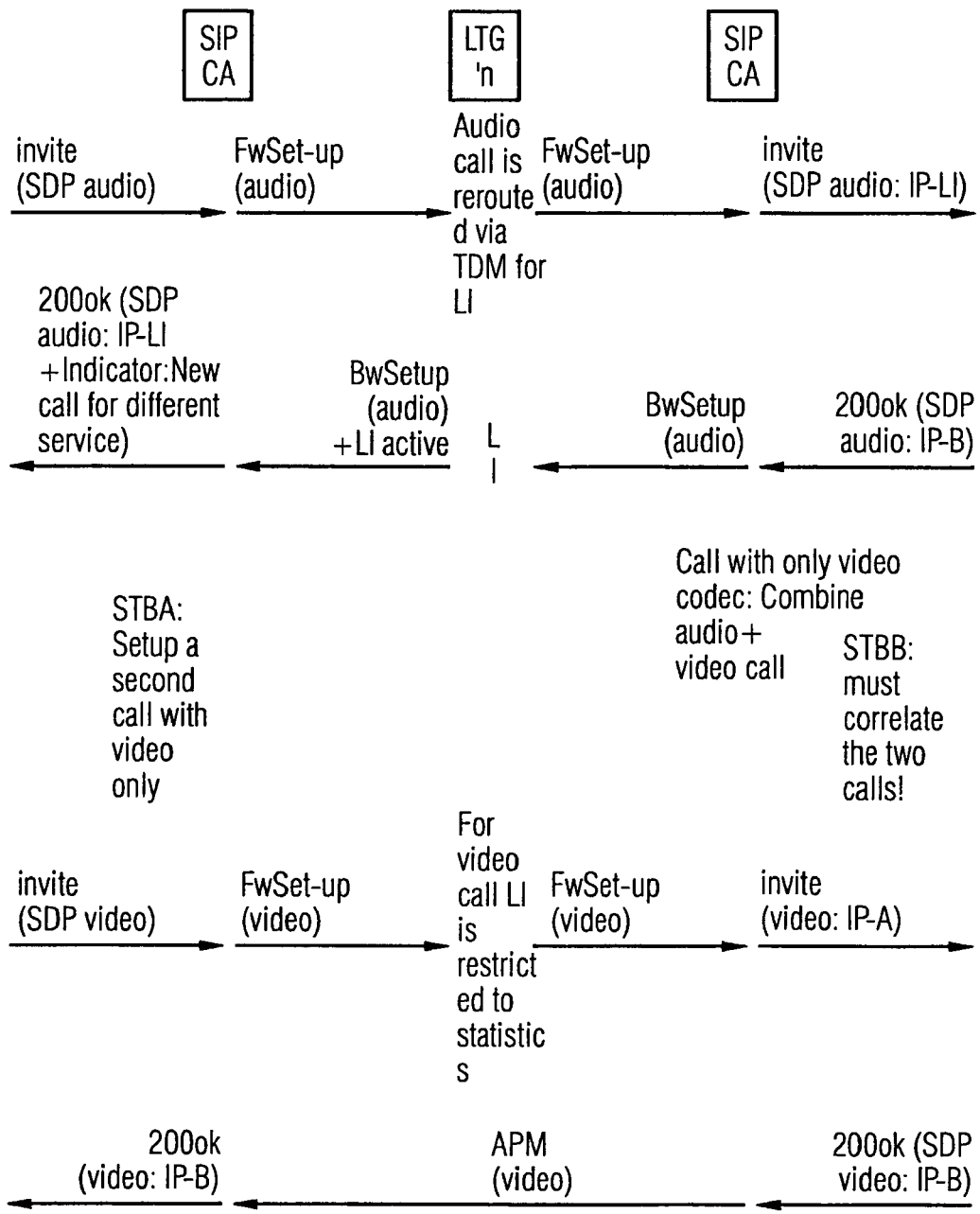

FIG. 3 shows the signaling messages and protocol elements on the basis of the SIP protocol. It is assumed in this respect that the tapping is effected at the A-end.

First, an initial SIP:INVITE message containing SDP information (audio codecs) is sent by the A subscriber to the front-end unit PCU. This INVITE message contains both the directory number of the subscriber A and also of the subscriber B. The Media Gateway Controller MGC therefore already knows with this message whether the call is to be tapped.

Once the A-end Media Gateway Controller MGC has detected that the call is to be tapped, the terminal is signaled to the effect that different calls have to be set up for different services. In the case of a tapping event, the audio call is captured in the classical manner via a TDM loop. During setup of the video connection, a new call is initiated, again by means of a SIP:INVITE message. This video call is not looped via TDM Gateways; instead, only statistical data is captured. The terminal at the B-end combines the audio and video payload data back into one call. If the initial INVITE message already contains audio plus video requests, the front-end unit PCU filters out the video codec in a 200ok message and simultaneously informs the terminal that it is to set up a new call for the video stream. The terminal therefore immediately initiates a second call, with video payload data only. The further sequence is identical to that described above.

Statistical data is transmitted (HI2, Standard) to the LEAs via X.25 or IP (FTP). The payload data is transmitted in the direction of the LEA via a 64 kbit/s connection with DSS1 signaling. In this respect, call-identifying information forms part of the sub-address in the signaling or UUS1 is used (HI3, Standard).

Figure 4:
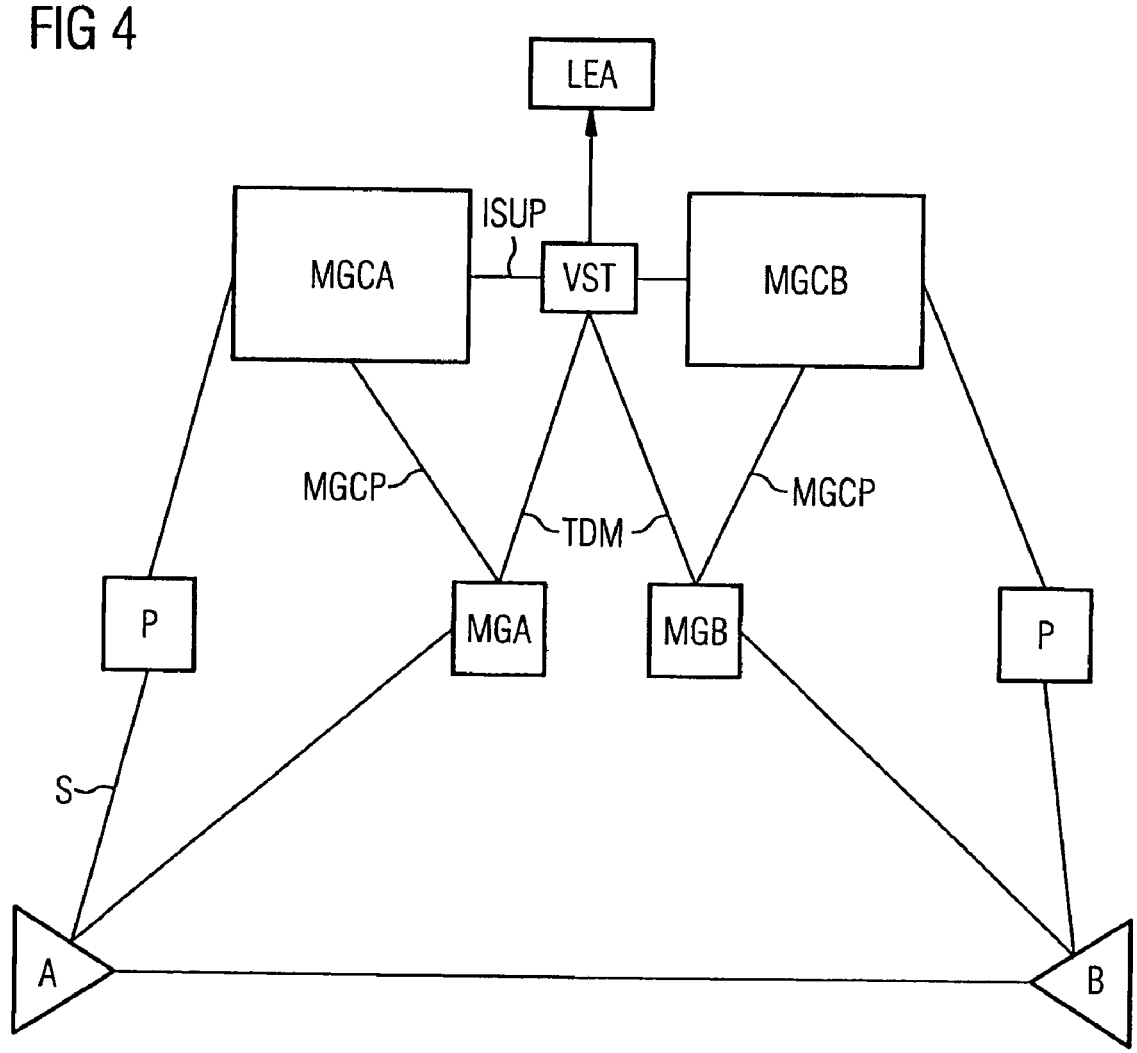

FIG. 4 shows a second exemplary embodiment. This provides for creating just one connection for audio and video instead of two connections. This is possible if the signaling of the terminals supports transmitting audio and video payload data to separate packet addresses and vice versa, in the receive direction, accepting these payload data streams from different packet addresses and merging them again.

It is now assumed in the following that subscriber A wishes to set up an audio/video connection to subscriber B. In this respect, the subscribers A and B can be SIP subscribers or H.323 subscribers; a mixed variant is similarly possible. By way of example, let it now be assumed that both subscribers are SIP subscribers and the SIP protocol is used as the signaling protocol.

For the purposes of connection setup, subscriber A sends a signaling message S to an allocated Proxy Server P. Said Proxy Server checks the authorization of the SIP subscriber A and passes on the signaling message S to the allocated Media Gateway Controller MGC A of the A-end.

The signaling message S is in the form of an INVITE message in the case of the SIP protocol (a SETUP message in the case of the H.323 protocol). The essential aspect in this respect is that said message carries information referring to its own directory number (Calling Party Number), the called directory number (Called Party Number), and information about whether a pure audio connection or an audio/video connection to subscriber B is desired. The video information furthermore contains the IP address of the subscriber A, which address therefore defines the address to which the RTP video payload data stream is to be sent. Codec information of the terminal is furthermore also stored here.

A check is then carried out in the Media Gateway Controller MGC A of the A-end as to whether the calling subscriber A or the called subscriber B is a subscriber who is to be monitored. A list is kept in the Media Gateway Controller MGC A for this purpose, which list contains all subscribers that have to be monitored. If subscriber A is to be monitored, a Media Gateway MG A is defined by the Media Gateway Controller MGC A via which the audio payload data stream is to be routed. Said Gateway must be capable of converting IP information to TDM and vice versa. In the following, the A-end subscriber A is then informed by the Media Gateway MG A which IP address (MG A) the audio information has to be sent to. This is generally the same address from which subscriber A later receives the audio payload data of the other party (subscriber B).

The audio portion of the signaling message S is then processed, while the video information then still has to be fed to the terminal of subscriber B. Said video information is fed to the B-end via TDM. By way of example, the ISUP protocol is used as the TDM protocol. A new parameter is then defined here, which takes up the video information (i.e. the video codec used, IP address, and port of the video RTP data stream) in the ISUP protocol and transmits it to the Media Gateway Controller MGC B of the B-end via TDM. On the one hand, said Media Gateway Controller then receives the quasi-tunneled message containing video information of the subscriber A. On the other hand, it is prompted via TDM, additionally to the video connection information, to connect an audio connection to the subscriber B in parallel. The Media Gateway Controller MGC B then generates an INVITE message. The tunneled video information is furthermore inserted in this INVITE message and fed to the subscriber B.

A Media Gateway MG B of the B-end is furthermore defined, to the extent that same is not yet defined, via which the audio payload data is routed to the subscriber B. The Media Gateway MG B of the B-end then informs the subscriber B of the IP address to which said subscriber B must transmit its audio payload data. This is generally the same address from which subscriber B receives the audio payload data of the other party (subscriber A).

This is acknowledged by subscriber B with a 200 ok message to subscriber A. The video portion is—as described above—transmitted (tunneled) via TDM in the ISUP with a new parameter and fed to subscriber A. The audio portion is sent to the B-end Media Gateway MG B, as in the case of a normal audio call, translated into TDM, and the TDM portion in turn translated into the RTP data stream by the A-end Media Gateway MG A, and therefore delivered to the A subscriber.

Only after this can the video connection be set up. Subscriber A then sends, in a single connection, video packets to the IP address of subscriber B and audio packets to the address of the Media Gateway MG A of the A-end. There, the audio payload data is converted to TDM signals and forwarded to the TDM switching office Vst with LI functionality of the A-end, where the tapping event is effected. In the further process, the audio payload data is passed in the form of TDM signals to the TDM switching office Vst with LI functionality of the B-end where they are forwarded to the Media Gateway MG B. There, the conversion of the TDM signals into IP packets is effected, which packets are forwarded to the subscriber B. The terminal of subscriber B then still has the task of merging audio payload data and video payload data.

In the following, the SDP data changes are shown in detail using the example of the SIP protocol.

A SIP A subscriber sends the following SDP to the MGC:
v=0
o=carol 28908764872 28908764872 IN IP4 100.3.6.6
s=-
t=0 0
c=IN IP4 192.0.2.4
m=audio 49170 RTP/AVP 0
a=rtpmap:0 PCMU/8000
m=video 51372 RTP/AVP 34
a=rtpmap:34 H263/90000

The MGC detects the need for an LI tapping event and changes to TDM and back into the packet protocol again. Consequently, the MGC sends the following SDP to the B subscriber:
v=0
s=hiE 1 1 IN IP4 100.3.6.6
o=-
t=0 0
m=audio 3870 RTP/AVP 0 Note: from the MG
c=IN IP4 193.0.1.1 Note: from the MG
a=rtpmap:0 PCMU/8000
m=video 51372 RTP/AVP 34 Note: tunnel information
c=IN IP4 192.0.2.4 Note: tunnel information
a=rtpmap:34 H263/90000

The B subscriber replies in the direction of the MGC:
v=0
o=bob 28908764872 28908764872 IN IP4 101.3.6.6

```
s=-
t=0 0
c=IN IP4 191.0.2.4
m=audio 49171 RTP/AVP 0
a=rtpmap:0 PCMU/8000
m=video 51373 RTP/AVP 34
a=rtpmap:34 H263/90000
```

The MGC replies by means of the conversion of the audio portion into TDM and again into the packet protocol in the direction of the A subscriber:

```
v=0
o=hiE 1 1 IN IP4 100.3.6.6
s=-
t=0 0
m=audio 49171 RTP/AVP 0 Note: from the MG
c=IN IP4 192.0.1.1 Note: from the MG
a=rtpmap:0 PCMU/8000
m=video 51373 RTP/AVP 34 Note: tunnel information
c=IN IP4 191.0.2.4 Note: tunnel information
a=rtpmap:34 H263/90000
```

Finally, by way of example, a mapping table from SIP to ISUP and ISUP to SIP is shown:

| SIP | ISUP/BICC | SIP |
|---|---|---|
| INVITE with video information and audio information -> | IAM with new parameter which transports the video information -> | INVITE with video information and audio information |
| <- 18x with video information and audio information | <- ACM/CPG with new parameter which transports the video information | <- 18x with video information and audio information |
| <- 200 with video information and audio information | <- ANM with new parameter which transports the video information | <- 200 with video information and audio information |

The mapping of the audio information is not described explicitly here, since this is known by means of the ITU-T Recommendations Q.1902.x (BICC) and Q.1912.5 and IETF RFC3398 (SIP/ISUP mapping in each case).

The second exemplary embodiment was described using the example of the ISUP protocol as a conventional TDM protocol. However, this is not a restriction. Thus, DSS1 or TUP or the like can similarly be used as a conventional TDM protocol. The same applies to the mapping from and to the IP protocol. The essence of the matter is that the terminals do not signal twice for audio and video separately; instead, the video endpoint data is tunneled together with the audio signaling via TDM (because audio is routed via TDM for the sake of LI). The new parameter in the ISUP is utilized for this purpose. The splitting of the payload data streams is then controlled by the PCU alone and not, as in the first exemplary embodiment, by the terminals themselves.

Finally, the invention is described using the example of video telephony, where two connections—one audio connection and one video connection—are involved. However, the invention is not restricted to two connections. Thus, a third connection such as a data connection, for example, or even further connections can also be involved, which connections can then be monitored correspondingly.

The invention claimed is:

1. A method for tapping a portion of data in a packet network, comprising:
   separating first data into a audio payload data and further payload data in a terminal of a subscriber sending multimedia data;
   routing the audio payload data via a TDM loop where the audio payload data are tapped by a law enforcement agency;
   sending directly to a recipient via the packet network the further payload data; and
   merging the audio payload data and further payload data.

2. The method as claimed in claim 1, wherein the separation of the audio payload data and further payload data is effected by the setting up of at least two connections.

3. The method as claimed in claim 1, wherein the separation of the audio payload data and further payload data is effected by the issuing of at least two packet addresses in the context of one single connection.

4. The method as claimed in claim 1, wherein a parameter and a mapping arrangement to and from an IP protocol is defined in a conventional TDM protocol, wherein a new parameter is defined to pass information about the further payload data.

5. The method as claimed in claim 1, wherein the first data are multimedia data and the further payload data are in the form of a video payload data of a multimedia connection.

6. The method as claimed in claim 5, wherein the audio and video payload data are merged such that propagation delays between an audio stream and a video stream are minimized via a suitable selection of a coding method.

7. The method as claimed in claim 1, wherein the further payload data are in the form of payload data of a data connection.

\* \* \* \* \*